United States Patent
Okamoto

(10) Patent No.: US 7,379,468 B2
(45) Date of Patent: May 27, 2008

(54) PACKET DISTRIBUTING APPARATUS AND PACKET DISTRIBUTING METHOD

(75) Inventor: Tsugio Okamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 1224 days.

(21) Appl. No.: 10/195,371

(22) Filed: Jul. 16, 2002

(65) Prior Publication Data
US 2003/0016666 A1 Jan. 23, 2003

(30) Foreign Application Priority Data
Jul. 18, 2001 (JP) .............................. 2001-218640

(51) Int. Cl.
H04L 12/56 (2006.01)
H04I 12/28 (2006.01)

(52) U.S. Cl. .................. 370/414; 370/230.1; 370/237; 370/400

(58) Field of Classification Search ............ 370/230.1, 370/232, 235, 237, 253, 351, 389, 392, 400, 370/412, 414, 313, 419, 477
See application file for complete search history.

(56) References Cited

U.S. PATENT DOCUMENTS

| | | | |
|---|---|---|---|
| 6,542,507 B1 * | 4/2003 | Khacherian et al. | ... 370/395.43 |
| 6,563,837 B2 * | 5/2003 | Krishna et al. | ............. 370/413 |
| 6,614,756 B1 * | 9/2003 | Morgenstern et al. | ...... 370/230 |
| 6,778,546 B1 * | 8/2004 | Epps et al. | .................. 370/413 |
| 6,788,697 B1 * | 9/2004 | Aweya et al. | ................ 370/412 |
| 6,963,576 B1 * | 11/2005 | Lee | ............................ 370/411 |
| 7,072,295 B1 * | 7/2006 | Benson et al. | .............. 370/230 |

* cited by examiner

*Primary Examiner*—Chi Pham
*Assistant Examiner*—Ahmed Elallam
(74) *Attorney, Agent, or Firm*—Young & Thompson

(57) ABSTRACT

In a packet distributing apparatus and a packet distributing method which, in a situation in which a link can be allocated to a specific user or a specific traffic with priority, can effectively utilize any unoccupied link, a packet inputted via first through Nth the input interface circuits $203_1$ through $203_N$ is provided by a transfer destination searching unit 205 with a transfer destination port and a transfer-admissible port. Then usage detecting units $211_1$ through $211_N$ check the usage of a transfer-admissible port matching the pertinent one of first through Nth output buffer units $209_1$ through $209_N$, and distribute the packet to a transfer-admissible port bearing a less load than a prescribed level (less loaded transfer-admissible port), such as an unloaded port. If there is no such less loaded transfer-admissible port, the packet is distributed to the transfer destination port for which it is destined in its own right. This arrangement makes it possible to utilize unoccupied ports and thereby to effectively utilize the links.

4 Claims, 10 Drawing Sheets

Fig.2

(USER IDENTIFICATION TABLE) 207

| | SENDER ADDRESS | SENDER PORT NO. | DESTINATION ADDRESS | DESTINATION PORT NO. | USER IDENTIFIER |
|---|---|---|---|---|---|
| 1 | 10.11.x.x | any | any | any | UID-2 |
| 2 | 10.2.x.x | any | any | any | UID-1 |
| 3 | | | | | |
| ⋮ | ⋮ | ⋮ | ⋮ | ⋮ | ⋮ |
| n | | | | | |

Fig.3

(TRANSFER DESTINATION PORT TABLE FOR ALL USERS) 208

| USER IDENTIFIER | DESTINATION ADDRESS | TRANSFER DESTINATION PORT | 1ST TRANSFER-ADMISSIBLE PORT | 2ND TRANSFER-ADMISSIBLE PORT | 3RD TRANSFER-ADMISSIBLE PORT | ... | t-TH TRANSFER-ADMISSIBLE PORT |
|---|---|---|---|---|---|---|---|
| UID-1 | 10.1.x.x | $P_2$ | $P_1$ | 0 | 0 | ... | 0 |
|  | 10.2.x.x | $P_4$ | 0 | 0 | 0 | ... | 0 |
|  | ... | ... | ... | ... | ... | ... | ... |
| UID-2 | 10.10.x.x | $P_1$ |  |  |  | ... |  |
|  | 10.11.x.x | $P_3$ |  |  |  | ... |  |
|  | ... | ... | ... | ... | ... | ... | ... |
| ... | ... | ... | ... | ... | ... | ... | ... |
| UID-m | ... | ... | ... | ... | ... | ... | ... |
|  | ... | ... | ... | ... | ... | ... | ... |

Fig.4

(TRANSFER DESTINATION PORT TABLE) ~208

| | DESTINATION ADDRESS | TRANSFER DESTINATION PORT | 1ST TRANSFER-ADMISSIBLE PORT | 2ND TRANSFER-ADMISSIBLE PORT | 3RD TRANSFER-ADMISSIBLE PORT | ..... | t-TH TRANSFER-ADMISSIBLE PORT |
|---|---|---|---|---|---|---|---|
| 1 | 10.1.x.x | $P_2$ | $P_1$ | 0 | 0 | ..... | 0 |
| 2 | 10.2.x.x | $P_4$ | 0 | 0 | 0 | ..... | 0 |
| 3 | ... | ... | ... | ... | ... | ..... | ... |
| n | | | | | | | |

Fig.5

(LOAD DETECTION SETTING TABLE) ~212

| | USAGE-THRESHOLD |
|---|---|
| 1 | 100 |
| 2 | 150 |
| 3 | ... |
| n | |

PACKET DISTRIBUTING APPARATUS AND PACKET DISTRIBUTING METHOD

BACKGROUND OF THE INVENTION

1. Field of the Invention

The present invention relates to a packet distributing apparatus and a packet distributing method for determining routes to which packets are to be distributed, and more particularly to a packet distributing apparatus and a packet distributing method for making possible effective utilization of communication links.

2. Description of the Related Art

In a network, such as the Internet, a packet sent by its sender reaches its destined recipient by successively going through a number of packet transfer apparatuses. The packet transfer apparatuses would be what are commonly known as routers, switches or hubs. The method of selecting the route over which a packet is to be sent is called routing.

A packet transfer apparatus references information periodically exchanged among nodes in the network, the required number of hops, transfer time, the presence or absence of trouble on the route and other information, and selects a single route that can provide each individual node with the shortest or the least expensive path.

FIG. 11 illustrates by way of example a network of a network service provider and first through fourth networks connected to it. It is supposed that first through fourth networks 101 through 104 are connected to a network 101 of the network service provider. Here, the first and third networks 101 and 103 are connected to a first router 111, and the second and fourth networks 102 and 104 are connected to a second router 112. The first router 111 and the second router 112 can be directly connected to each other by a link 114. The first router and the second router 112 can as well be connected to each other via a third router 113 using links 115 and 116.

Now it is supposed that the first network 101 and the second network 102 are connected to each other via the network 101 of the network service provider. If the routing is to be determined accorded to the number of hops, the route using the link 114 directly linking the first router 111 and the second router 112 will be set. Where routing is set between the first network 101 and the second network 102 in this manner, the set routing will never be changed unless network trouble such as a node failure arises, the network configuration is altered or the operator of any network changes the setting for itself. Therefore, supposing that a user (not shown) of the first and second networks 101 and 102 has a contract for exclusive use of the link 114 with the network service provider of the network 100, even if the user A uses the link 114 with a load of far less than 100%, no other user B (not shown) can use the link 114.

If the user B intends to establish a communication link (hereinafter referred to as simply "link") between the third network 103 and the fourth network 104, the aforementioned contract will prevent this user from using the link 114, and only the link 115 for linking the first router 111 and the third router 113 or the link 116 for linking the second router 112 and the third router 113 can be set for the user B. Thus, even when the link 114 is not used by the first and second networks 101 and 102, this link 114 cannot be used by the user B.

As described above, the conventional method by which each user selects only one route and sends out packets on this route prevents the whole network from efficient utilization.

In view of this problem, there is proposed an idea of distributing loads in the whole network. For instance, to reduce the load on the node bearing the heaviest load in the network, the traffic can be distributed among a plurality of routes. This idea presupposes that all the users or traffics using the network are to be equal. If any inequality arises, loads on a plurality of links will be distributed in a calculated ratio.

By this proposed method, however, the ratio of load distribution among the plurality of links is fixed. Therefore, where a link is allocated exclusively or with priority to a specific user or a specific traffic, if there happens to arise a situation in which that link is not used, it will result in the same problem as with the prior art that the network cannot be effectively utilized.

SUMMARY OF THE INVENTION

An object of the present invention, therefore, is to provide a packet distributing apparatus and a packet distributing method which, in a situation in which a link can be allocated to a specific user or a specific traffic with priority, permit effective utilization of any unoccupied capacity that may arise on that link.

A packet distributing apparatus according to the invention is provided with a plurality each of input ports and output ports, prepared for inputting and outputting of packets and each linked to a different node;

transfer destination ports each to be selected with priority as an output port, on the basis of information inputted from the plurality of input ports, when the packet is to be sent to its destination;

a port information searching unit for searching for information regarding a transfer-admissible port as an output to which a transfer is possible as judged from the usage of the link;

packet storage buffers for temporarily storing the packet inputted from the plurality of input ports until it is outputted from the plurality of output ports, and one prepared on each of the plurality of output ports;

a transfer-admissible port loaded state judging unit for judging from the usage of the matching one of the packet storage buffers whether or not there is a less loaded transfer-admissible port, on which the load of packet output is less than a prescribed value, among the transfer-admissible ports; and a packet sending unit for sending, when the transfer-admissible port loaded state judging unit has judged that there is a less loaded transfer-admissible port among the transfer-admissible ports, a packet stored in the packet storage buffer to the less loaded transfer-admissible port.

In this configuration, when a packet is inputted from an input port, the port information searching unit searches for two kinds of information including information on output ports each to be selected with priority according to information written in that packet (transfer destination ports) and output ports to which transferring is possible as judged from the link usage (transfer-admissible ports). The usage of each of the packet storage buffers prepared on the side of the plurality of output ports is checked, and if there is an output port bearing a less load of packet output than a prescribed value among the transfer-admissible ports (less loaded transfer-admissible port), the packet is distributed to this less loaded transfer-admissible port, thereby making possible packet sending control matching the port load level from time to time and effective utilization of any unoccupied capacity on the link.

BRIEF DESCRIPTION OF THE DRAWINGS

The above and other objects, features and advantages of the present invention will become more apparent from the following detailed description when taken in conjunction with the accompanying drawings, wherein:

FIG. 2 shows an example of contents set in a user identification table in FIG. 1;

FIG. 3 shows the contents of a transfer destination port table for all users in the first preferred embodiment of the invention;

FIG. 4 shows the contents of identifiers in the transfer destination port table in FIG. 3;

FIG. 5 shows an example of contents set in a load detection setting table in FIG. 1;

DETAILED DESCRIPTION OF THE PREFERRED EMBODIMENTS

Modes of implementing the present invention in packet distributing apparatuses and packet distributing methods will be described below with reference to FIG. 1 through FIG. 11.

Figure 1:
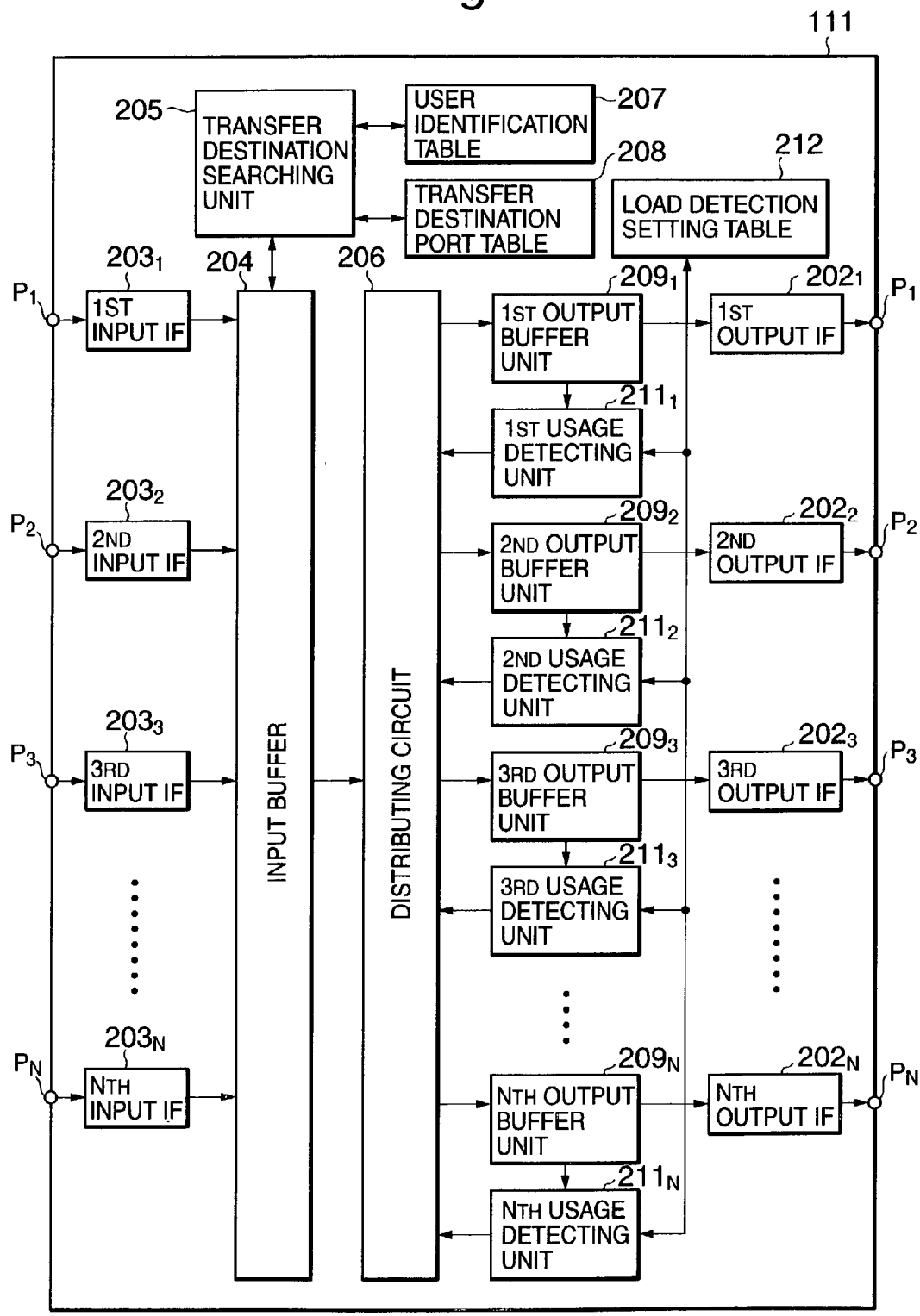
FIG. 1 is a block diagram showing the configuration of a router as a packet distributing apparatus, which is a first preferred embodiment of the invention.

FIG. 1 shows the configuration of a router as a packet distributing apparatus, which is a first preferred embodiment of the invention. A first router 111 is provided with first through Nth ports $P_1$ through $P_N$ to be connected to match first through Nth nodes not shown. The first through Nth ports $P_1$ through $P_N$ are connected to first through output interface circuits (IF) $202_1$ through $202_N$ and first through Nth input interface circuits (IF) $203_1$ through $203_N$ provided to match the respective ports.

The first through Nth input interface circuits $203_1$ through $203_N$ convert physical signals, such as electrical signals or optical signals inputted from respectively matching first through Nth ports $P_1$ through $P_N$ into logical signals of Internet Protocol (IP) packet data or frame data (hereinafter collectively referred to as packet data). Signals converted by the input interface circuits $203_1$ through $203_N$ into packet data are transferred to an input buffer 204.

The input buffer 204 is a circuit for temporarily storing packet data until the port of transfer destination is determined. The input buffer 204 is connected to a transfer destination searching unit 205 and a distributing circuit 206.

The transfer destination searching unit 205 searches header information and the like contained in a packet for user identifying information and a transfer destination port, and instructs the input buffer 204 to transfer the retrieved information. To the transfer destination searching unit 205 are connected a user identification table 207 and a transfer destination port table 208.

The user identification table 207 is a table for finding from header information and the like contained in a packet a user identifier by which a user can be unequivocally identified.

The transfer destination port table 208 is a table holding user identifying information, transfer destination ports matching destination addresses, and information on transfer-admissible ports.

The distributing circuit 206 receives from the input buffer 204, after the transfer destination port is determined, packet data and the transfer destination port number. On the output side of the distributing circuit 206 are provided first through Nth output buffer units $209_1$ through $209_N$ and first through Nth usage detecting units $211_1$ through $211_N$ provided to match these output buffer units.

To the first through Nth usage detecting units $211_1$ through $211_N$ is connected a load detection setting table 212. The first through Nth usage detecting units $211_1$ through $211_N$ read the usage (quantity of buffered packet data) of the matching one of the first through Nth output buffer units $209_1$ through $209_N$, and notifies the distributing circuit 206 as to whether or not that value is above a preset value in the load detection setting table 212.

Packets stored in the first through Nth output buffer units $209_1$ through $209_N$ are outputted to the respectively matching ones of first through Nth output interface circuits $202_1$ through $202_N$.

The first through Nth output interface circuits $202_1$ through $202_N$ convert logical signals, such as packet data, into physical signals, such as electrical signals or optical signals, and output converted signals.

FIG. 2 shows an example of contents set in the user identification table 207 explained with reference to FIG. 1. The user identification table 207, as described above, is intended for finding a user identifier by which a user can be unequivocally identified. As information for identifying a user, any field of packet data (e.g. the header information part) can be used if applicable. In this case, a sender address required for identifying one connection in the transmission control protocol (TCP) as a protocol used for communication between Internet hosts, a sender, a destination address and a destination port number are shown byway of example. Entries "any" in the user identification table 207 mean that whatever value in that field would specify a user identifier. Therefore, in the user identification table 207 of FIG. 2, the user identifier is specified by the sender address alone.

FIG. 3 shows the contents of a transfer destination port table 208 for all users. This transfer destination port table 208 holds information for the transfer destination searching unit 205 shown in FIG. 1 to find a transfer destination port and transfer-admissible port from a user identifier and a destination address. The user identifier here can be found from the user identification table 207 shown in FIG. 2.

The destination address is information indicating the destination node of transferred packet data. This corresponds to the "DESTINATION ADDRESS" field in the Internet Protocol prescribed in the request for comments (RFC) 791 put together by the (Internet Engineering Task Force (IETF), the standardization body for Internet-related technology.

In the column of the "transfer destination port" in the transfer destination port table 208 shown in FIG. 3, one route determined according to the routing protocol used by the Internet is indicated as is the conventional practice. By the conventional router differing from this embodiment of the invention, packets are transferred solely according to information shown in this "transfer destination port" column. Unlike that, the transfer destination port table 208 in this embodiment has, in addition to this "transfer destination port", columns of a "first transfer-admissible port" through a "t-th transfer-admissible port". These "transfer-admissible ports" cannot be used for transferring when traffics having priority in their use are using these transfer-admissible ports. However, when no traffic having priority is using any of them, these transfer-admissible ports can be used for transferring. In the transfer destination port table 208, these available ports are also listed.

FIG. 4 shows a part where the user identifier is "UID-1", extracted from the transfer destination port table shown in FIG. 3. As shown in FIG. 4, packet whose "destination address" is "10.1.x.x" can use the port "$P_2$" as the usual transfer destination port. Also, to make the port "$P_1$" also available as a transfer destination when this port "$P_1$" is not used, "$P_1$" is set in the column of the first transfer-admissible port.

To add, "x" in the transfer destination port table 208 of FIG. 4 can be any numerical value. Therefore, for instance "10.2.x.x" means that any address beginning with "10.2." can fit in.

FIG. 5 shows an example of configuration of the load detection setting table in FIG. 1. In the load detection setting table 212, the threshold of usage (the maximum number of buffered packets) is set for each of the first through Nth output buffer units $209_1$ through $209_N$. In the example shown in FIG. 5, the threshold for the first output buffer unit $209_1$ is "100".

Figure 11:
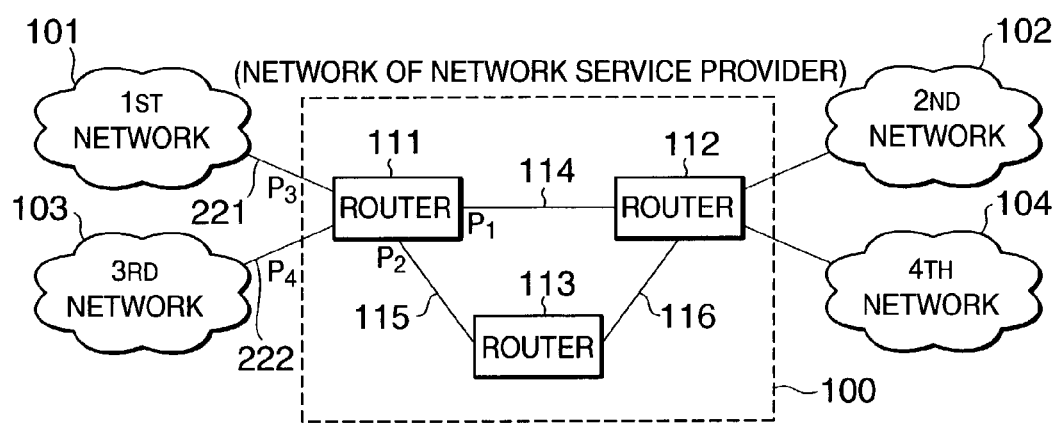
FIG. 11 shows a network configured of a network, consisting of a router which may be any of the embodiments of the invention, of a network service provider and first through fourth networks connected to this network.

The operation of the router 111 as the packet distributing apparatus configured as described will be explained in detail below. In this embodiment, too, the same network configuration as what is shown in FIG. 11 is supposed to be used. Further, the second and third routers 112 and 113 are supposed to have the same internal configuration as that of the first router 111.

As shown in FIG. 11, the aforementioned first port $P_1$ of the first router 111 is supposed to be connected to the link 114, and the second port $P_2$, connected to the link 115. Further, the third port $P_3$ is supposed to be connected to a link 221, the fourth port $P_4$, to a link 222. The user identifier of the user belonging to the first network 101 and the second network 102 is supposed to be "UID-2", and that of the user belonging to the third network 103 and the fourth network 104, to be "UID-1".

In this case, the user of the first network 101 is supposed to have an address beginning with "10.11" as shown in FIG. 3, and the user of the second network 102, an address beginning with "10.10". The user of third network 103 is supposed to have an address beginning with "10.2", and the user of the fourth network 104, an address beginning with "10.1".

To look at the setting of the destination address "10.1.x.x" as shown in FIG. 3, the first router 111 on a normal occasion can transfer a packet to the second port $P_2$ using the user identifier "UID-1". It is shown that, when the first port PI is not used by the user having the user identifier "UID-2", the user having the user identifier "UID-1" can also use the first port PI as the first transfer-admissible port.

Next will be described in specific terms, by way of example, the operation that takes place when the user of the third network 103 in FIG. 11 transfers a packet to the first router 111.

It is supposed that the user of the third network 103 transfers a packet to the user of the fourth network 104. The address of the user of the third network 103 is supposed to begin with "10.2". Therefore, the sender address may be, for instance, "10.2.100.100". The destination, as it is the user of the fourth network 104, will be "10.1.50.50" for instance.

The packet transmitted from the third network 103 arrives at the fourth port $P_4$ of the first router 111. The data having arrived at the fourth port P4 are converted by a fourth input interface circuit $203_4$ from physical signals into signals consisting of logical packet data. The converted data are transferred to the input buffer 204. The input buffer 204 hands over to the transfer destination searching unit 205 the field of the packet data required by the transfer destination searching unit 205. In this example, the information part having a sender address of "10.2.100.100" and a destination address of "10.1.50.50" is handed over to the transfer destination searching unit 205. The input buffer 204 holds the packet data and waits until search processing by the transfer destination searching unit 205 is completed.

The transfer destination searching unit 205 searches for a setting identical with the sender address, the sender port number, the destination address and the destination port number notified from the input buffer 204. Searching for the sender port number and the destination port number are set to fit any values as shown in the user identification table 207 of FIG. 2. Therefore, description of the operation to search for the sender port number and the destination port number will be dispensed with.

Further, as the sender address is "10.2.100.100", it fits the setting on the second row of the user identification table 207 in FIG. 2. Accordingly, it is identified to be the user having the user identifier "UID-1".

Next, a setting that fits these user identifier "UID-1" and destination address "10.1.50.50" are searched for in the transfer destination port table 208 shown in FIG. 1 and FIG. 4. As a result of this search, the contents of the first row of the transfer destination port table 208 are found identical because the destination address is set to be "10.1.x.x" there. Therefore, the transfer destination port is found to be the second port $P_2$, and the transfer-admissible port, the first port $P_1$.

The transfer destination searching unit 205 hands over to the input buffer 204 the information thereby obtained. The input buffer 204 which has held the packet data and waited transfers, using the information from the transfer destination searching unit 205, information indicating that the transfer destination port of the packet data is the second port $P_2$ and that the transfer-admissible port is the first port $P_1$ to the distributing circuit 206.

Figure 6:
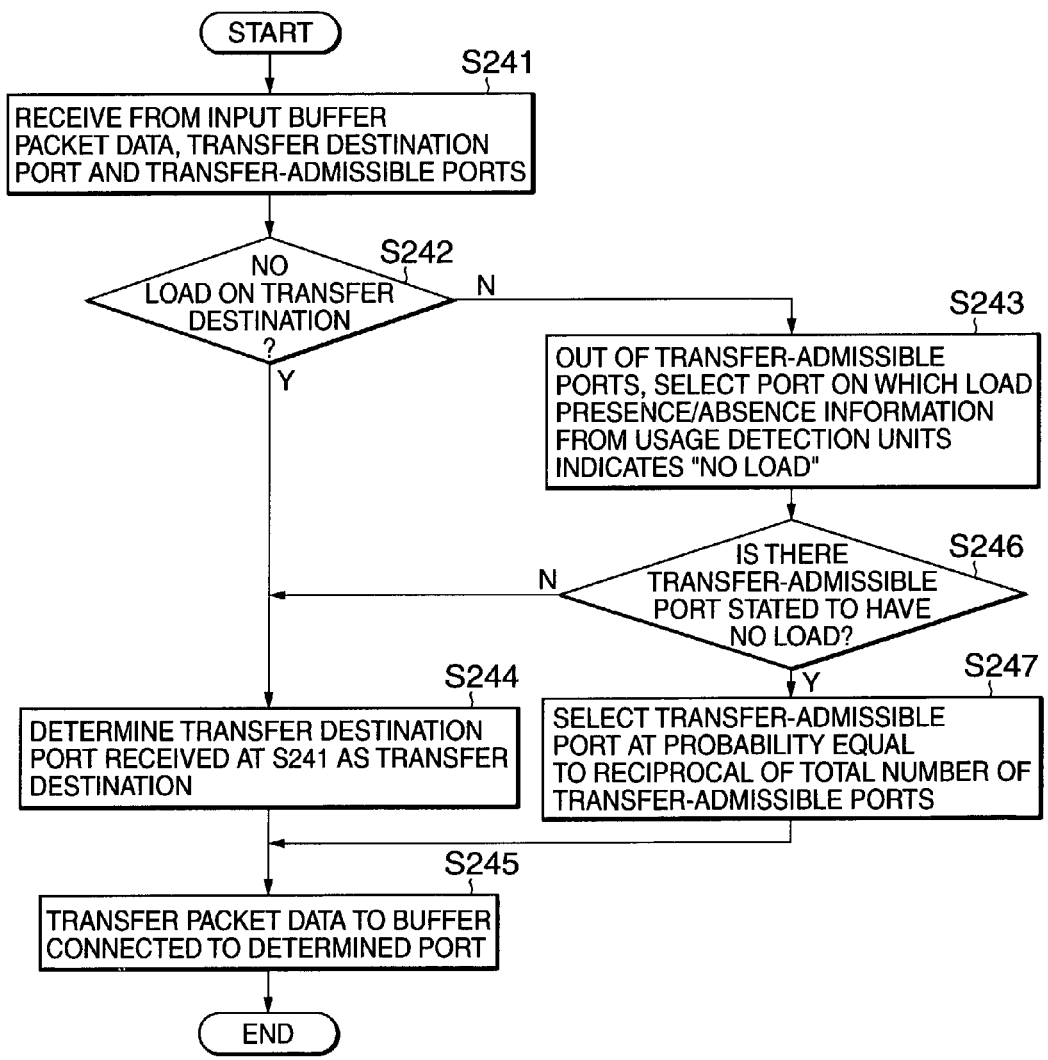
FIG. 6 is a flow chart showing the processing by a distributing circuit in the first embodiment of the invention.

FIG. 6 is a flow chart showing the processing by the distributing circuit 206 shown in FIG. 1. The first router 111 is provided with a central processing unit (CPU) though not shown, and performs prescribed control of the distributing circuit 206 by executing a program stored on a recording medium such as a Read Only Memory (ROM) not shown either.

The distributing circuit 206 first receives from the input buffer 204 the packet data and information on the transfer destination port and the first through t-th transfer-admissible ports (step S241). In the instance described above, the distributing circuit 206 receives information indicating that the transfer destination port is the second port $P_2$ and that the transfer-admissible port is the first port $P_1$.

Next, it is judged whether or not the transfer destination port is stated to have "no load" (step S242). If it has "no load", the transfer destination port regarding which information was received at step S241 is determined to be the transfer destination (step S244). Then, the packet data are transferred to the output buffer unit 209 (one of the first through Nth output buffer units 209₁ through 209_N) connected to this determined transfer destination port (step S245) to end the processing (END).

Or if the transfer destination port is not stated to have "no load" at step S242 ("N" at S242), the following processing will take place. First, the distributing circuit 206, according to the information on the presence or absence of load on each port notified from the first through Nth usage detecting units 211₁ through 211_N, searches for a port in a state of "no load" out of the first through t-th transfer-admissible ports (step S243). Then it judges whether or not there is any port stated to have "no load" among the transfer-admissible ports (step S246). If every transfer-admissible port is loaded ("N" at S246), even if the transfer destination port is loaded, the transfer destination port is determined as the transfer destination (step S244). The sequence proceeds to step S245 to transfer the packet data to the output buffer unit 209 connected to that transfer destination port.

FIG. 3 shows the contents of a transfer destination port table 208 for all users. This transfer destination port table 208 holds information for the transfer destination searching unit 205 shown in FIG. 1 to find a transfer destination port and transfer-admissible port from a user identifier and a destination address. The user identifier here can be found from, the user identification table 207 shown in FIG. 2.

If this, processing at step S247 is done, the sequence proceeds to step S245, and the packet data are transferred to, out of the output buffer units 209 (one of the first through Nth output buffer units 209₁ through 209_N), what is connected to the transfer-admissible port is selected at the aforementioned probability.

To add, in this embodiment of the invention, only the first port P1 is the transfer-admissible port as shown in FIG. 4. Therefore, at step S246, the packet data are transferred to the first output buffer unit 209₁ connected only to the first port P₁.

Next will be described the operation of a second preferred embodiment of the present invention.

Figure 7:
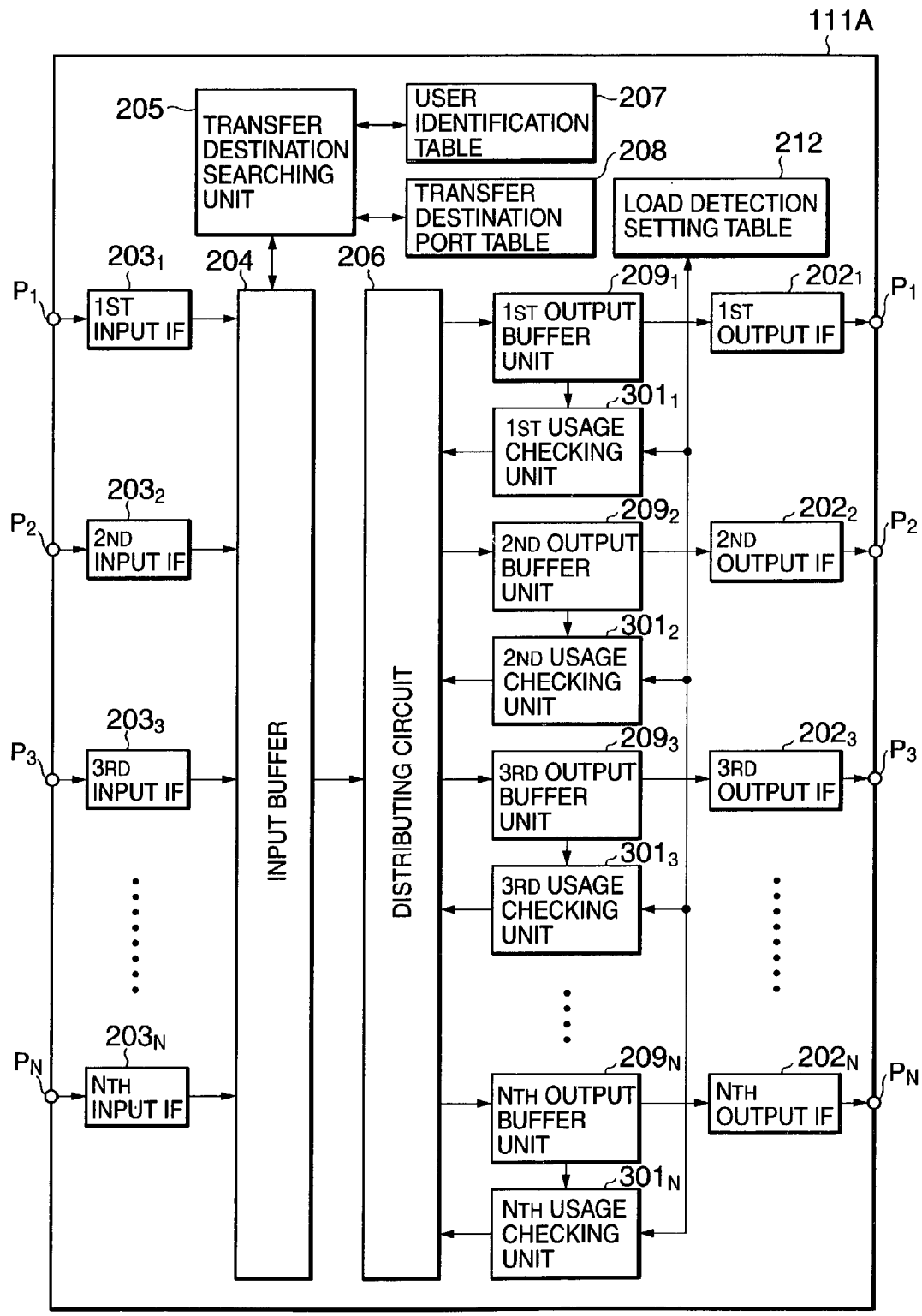
FIG. 7 is a block diagram showing the configuration of a router in a second preferred embodiment of the invention.

FIG. 7 shows the configuration of a first router 111A in the second preferred embodiment of the invention. The same constituent elements as in the first embodiment shown in FIG. 1 are assigned respectively the same reference signs, and their description will be dispensed with. In the first router 111A in the second embodiment, first through Nth usage checking units 301₁ through 301_N are arranged in place of the first through Nth usage detecting units 211₁ through 211_N in the first embodiment. In these usage checking units 301₁ through 301_N, in addition to the comparison of setpoints and buffered quantities in the load detection setting table 212 used in the first embodiment, the ratio of load using a function (f(x) to be explained afterwards) is also notified to the distributing circuit 206.

For instance, the buffered quantity held by the buffer memories of the first through Nth output buffer units 209₁ through 209_N matching the first through Nth usage checking units 301₁ through 301_N is represented by "x", and a function varies by this buffered quantity "x" is represented by a function f(x). This function f(x) shows the ratio of loads among the first through Nth output buffer units 209₁ through 209_N.

Incidentally, in the first embodiment, transfer-admissible ports are determined according to whether or not the threshold set in the load detection setting table 212 shown in FIG. 1 is surpassed, and selected each at the same probability (the reciprocal of the total number of transfer-admissible ports). Therefore, unlike in the second embodiment, it is impossible to vary the ratio of port selection according to the ratio of loads.

Now, possible functions f (x) representing loads include the following example. The maximum buffer length that can be held by each of the first through Nth output buffer units 209₁ through 209_N is represented by "M". Then, the function representing loads can be represented by the following Equations (1):

If $x \leq M$, $f(x)=x/M$

If $x>M$, $f(x)=1$ \hfill (1)

where "x" is the quantity of packet data held by each of the first through Nth output buffer units 209₁ through 209_N.

Next will be described an instance in which the probability of port selection is varied with the ratio of loads. The ratio of loads at the first port P₁ is represented by f (x₁). The ratio of loads at the second port P2 is represented by f(x₂), and that at the third port P₃, by f (X₃). Further, it is supposed that f'(x)=1/f(x).

Then, the probability R₁ of selecting the first port P₁ is calculated by the following Equation (2):

$R_1 = f'(x_1)/\{f'(x_1)+f'(x_2)+f'(x_3)\}$ \hfill (2)

The probability R₂ of selecting the second port P₂ and the probability R₃ of selecting the third port P₃ are calculated by the following Equations (3) and (4), respectively:

$R_2 = f'(x_2)/\{f'(x_1)+f'(x_2)+f'(x_3)\}$ \hfill (3)

$R_3 = f'(x_3)/\{f'(x)+f'(x_2)+f'(x_3)\}$ \hfill (4)

where the sign "x" represents the buffer usage of the first output buffer unit 2091 matching the first port P₁. Similarly, the sign "x₂" or "x₃" represents the buffer usage of the second or third output buffer unit 209₂ or 209₃ matching the second port P₂ or the third port P₃, respectively.

Figure 8:
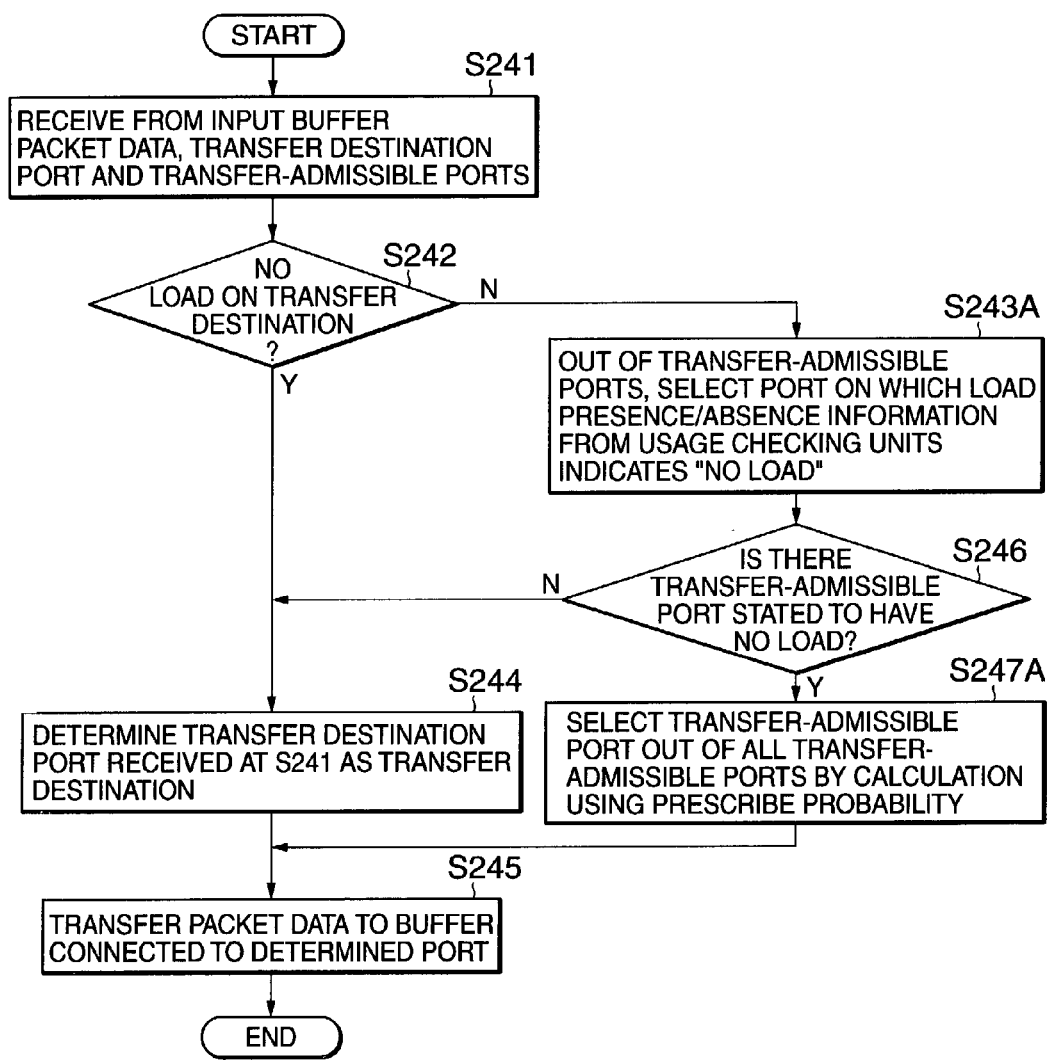
FIG. 8 is a flow chart showing the processing by a distributing circuit in the second embodiment of the invention.

FIG. 8 is a flow chart showing the processing by the distributing circuit in the second embodiment of the invention. In this FIG. 8, the same parts as in FIG. 6 are assigned respectively the same reference signs.

The distributing circuit 206 first receives from the input buffer 204 packet data and information regarding the transfer destination port and the first through t-th transfer-admissible ports (step S241). In the second embodiment, as in the first embodiment, the distributing circuit 206 receives information indicating that the transfer destination port is the second port P₂ and the transfer-admissible port is the first port P₁.

Next, it is judged whether or not the transfer destination port is stated to have "no load" (step S242). If it is, the transfer destination port regarding which information was received at step S241 is determined as the transfer destination (step S244). Then the packet data are transferred to the output buffer unit 209 (one of the first through Nth output buffer units 2091 through 209N) connected to this determined transfer destination port (step S245) to end the processing (END).

Or if the transfer destination port is not stated to have "no load" at step S242 ("N" at S242), the following processing will take place. First, the distributing circuit 206, according to the information on the presence or absence of load on each port notified from the first through t-th usage detecting units 301₁ through 301_N, searches for a port in a state of "no load" out of the first through t-th transfer-admissible ports (step S243A). Then it judges whether or not there is any port stated to have "no load" among the transfer-admissible ports (step S246). If every transfer-admissible port is loaded ("N" at S246), even if the transfer destination port is loaded, the transfer destination port is determined as the transfer destination (step S244) The sequence proceeds to step S245 to transfer the packet data to the output buffer unit 209 connected to that transfer destination port.

On the other hand, if the transfer destination port itself is not stated to have "no load" and there is any transfer-admissible port stated to have "no load" ("Y" at S246), one of these transfer-admissible ports is selected according to a calculated probability (step S247A).

If this processing at step S247A is done, the sequence proceeds to step S245, and the packet data are transferred to the output buffer unit 209 connected to the transfer-admissible port selected at the aforementioned probability (one of the first through Nth output buffer units $209_1$ through $209_N$).

Incidentally, the reciprocal of the load ratio can be represented by the following Equation (5), where f(x) is the load ratio of a port x:

$$f'(x)=1/f(x) \quad (5)$$

In this case, the probability of selecting a port $P_i$ (i=1, 2 . . . m) can be represented by the following formula (6):

$$f'(p_i')/\{f'(p_1')+f'(p_2')+\ldots+f'(p_m')\} \quad (6)$$

For instance, the probability of selecting the first port $P_1$ will be as represented by the following formula (7):

$$f'(p_1')/\{f'(p_1')+f'(p_2')+\ldots+f'(p_m')\} \quad (7)$$

Next will be described the operation of a third preferred embodiment of the present invention.

Figure 9:
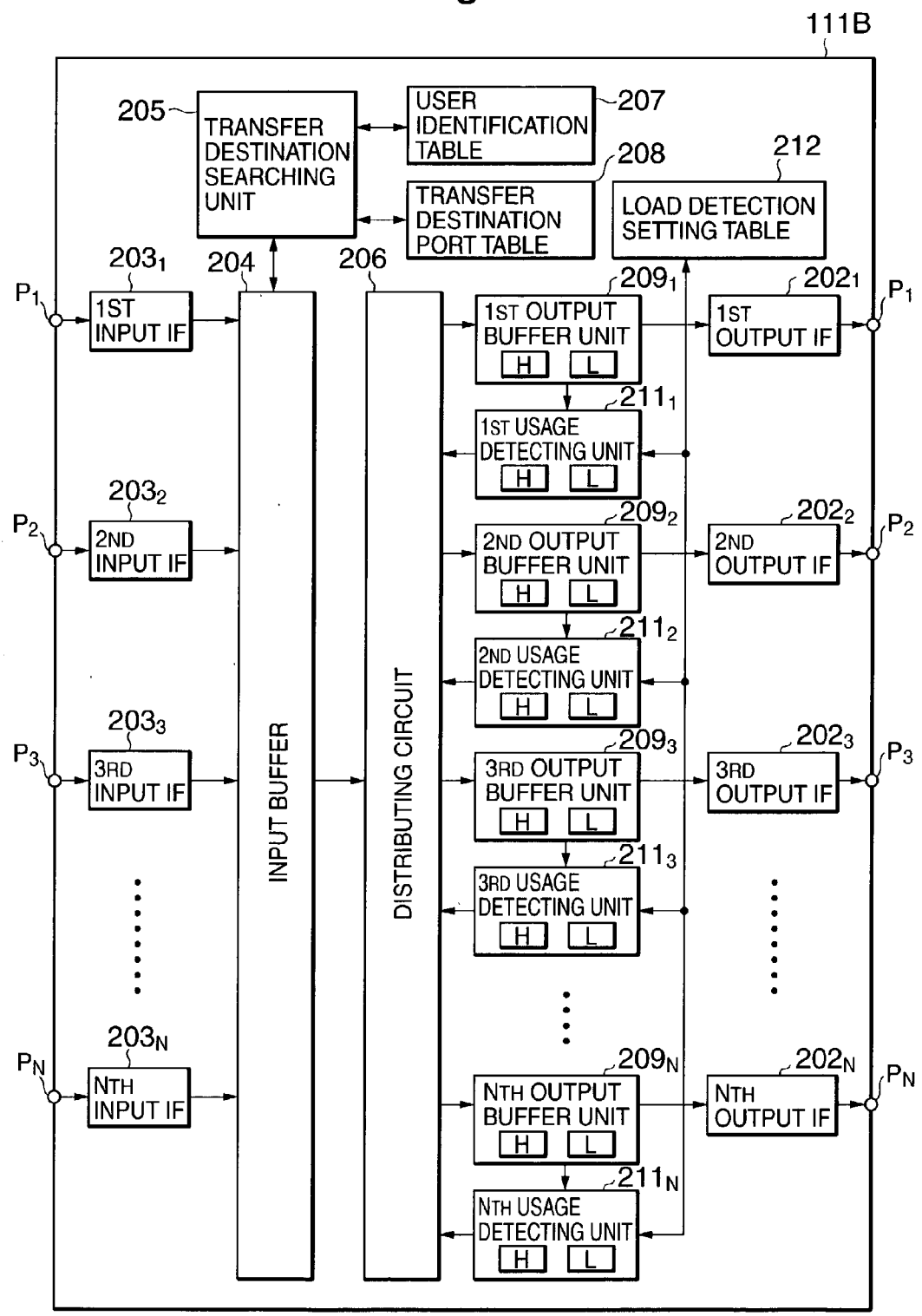
FIG. 9 is a block diagram showing the configuration of a router in a third preferred embodiment of the invention.

FIG. 9 showing the configuration of a first router 111B in the third preferred embodiment of the invention. For the router 111B in this third embodiment, the same constituent elements as in the first embodiment shown in FIG. 1 are assigned respectively the same reference signs, and their description will be dispensed with. Each of first through Nth output buffer units $209_1$ through $209_N$ of the router 111B in this second embodiment consists of a high priority buffer H and a low priority buffer L. While the high priority buffer H and the low priority buffer L can store packets at the same time, when packets are stored at the same time, a packet is always taken out first from the high priority buffer H, and outputted to the matching one of the first through Nth output interface circuits $202_1$ through $202_N$. The low priority buffer L outputs packet stored therein to the matching one of the first through Nth output interface circuits $202_1$ through $202_N$ only when there is no packet in the high priority buffer H.

The first through Nth usage detecting units 2111 through $211_N$ read the usage (the quantity of buffered packet data) of the high priority buffer H and that of the low priority buffer L for each of the first through Nth output buffer units $209_1$ through $209_N$. The first through Nth usage detecting units $211_1$ through $211_N$ notify the distributing circuit 206 whether or not the usage of the high priority buffer H and that of the low priority buffer L have surpassed the value set in the load detection setting table 212. The first through Nth output interface circuits $202_1$ through $202_N$ convert logical signals, such as packet data, into physical signals, such as electrical signals or optical signals, and output converted signals.

The user's packet which should be transferred in its own right in the router 111B of this third embodiment is transferred to the high priority buffer H of the matching one of first through Nth output buffer units 2091 through 209N. On the other hand, a packet transferred to a port selected as a transfer-admissible port is stored in the low priority buffer L of the matching one of the first through Nth output buffer units $209_1$ through $209_N$. Managing the first through Nth output buffer units $209_1$ through $209_N$ with discrimination between the high priority buffer H and the low priority buffer L in such a manner makes possible efficient transferring of packets without affecting the user's packet which should be transferred in its own right.

In this third embodiment, the first through Nth usage detecting units $211_1$ through $211_N$ notify the distributing circuit 206 of information as to whether or not the usage of the high priority buffer H (fh(x)) has surpassed the threshold set in the load detection setting table 212. The first through Nth usage detecting units $211_1$ through $211_N$ also notify the distributing circuit 206 of the load ratio of the low priority buffer L(fl(x)).

Figure 10:
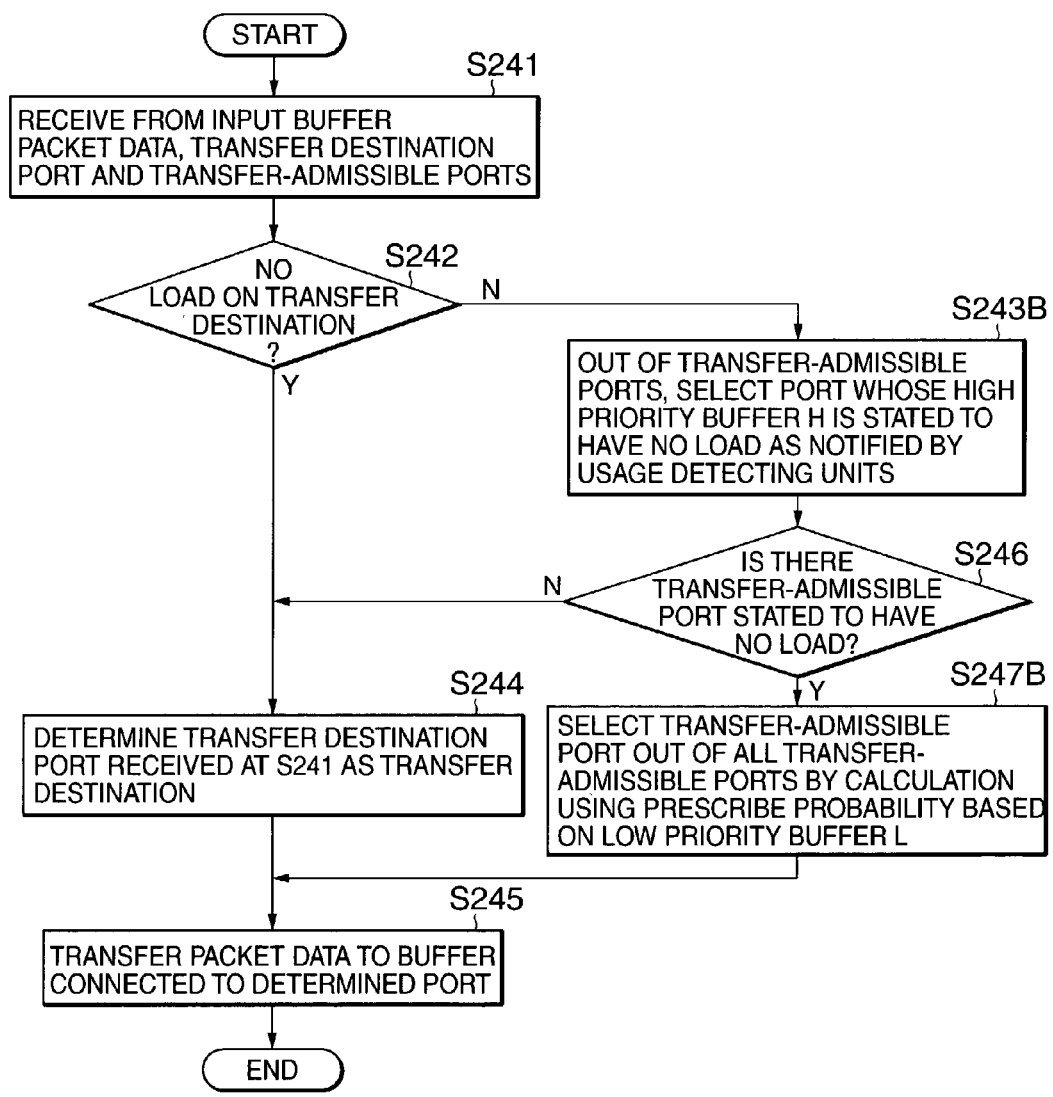
FIG. 10 is a flow chart showing the processing by a distributing circuit in the third embodiment of the invention.

FIG. 10 is a flow chart showing the processing by the distributing circuit in the third embodiment of the invention. In this FIG. 10, the same parts as in FIG. 6 and FIG. 8 are assigned respectively the same reference signs.

The distributing circuit 206 first receives from the input buffer 204 packet data and information regarding the transfer destination port and the first through t-th transfer-admissible ports (step S241).

Next, it is judged whether or not the transfer destination port is stated to have "no load" (step S242). If it is, the transfer destination port regarding which information was received at step S241 is determined as the transfer destination (step S244). Then the packet data are transferred to the output buffer unit 209 (one of the first through Nth output buffer units $209_1$ through $209_N$) connected to this determined transfer destination port (step S245) to end the processing (END).

Or if the transfer destination port is not stated to have "no load" at step S242 ("N" at S242), the following processing will take place. First, the distributing circuit 206, according to the information regarding the load on the high priority buffer H of each port notified from the first through Nth usage detecting units $211_1$ through $211_N$ searches for a port of which the high priority buffer H has "no load" out of the first through t-th transfer-admissible ports (step S243B). Then it judges whether or not there is a port of which the high priority buffer H is stated to have "no load" out of the transfer-admissible ports (step S246). If there is a load on the high priority buffer H of every transfer-admissible port ("N" at S246), even if there is a load on the transfer destination port, the transfer destination port is determined as the transfer destination (step S244). The sequence proceeds to step S245, and the packet data are transferred to the output buffer unit 209 connected to that transfer destination port.

On the other hand, if the transfer destination port itself is not stated to have "no load" and there is any transfer-admissible port stated to have "no load" ("Y" at S246), one out of all these transfer-admissible ports is selected according to a probability calculated on the basis of the load on the low priority buffer L of each transfer-admissible port (step S247B). As the numerical expressions for calculating this probability here are the same as those presented for the second embodiment except for the use of low priority buffers L, their description is dispensed with.

If this processing at step S247B is done, the sequence proceeds to step S245, and the packet data are transferred to the output buffer unit 209 connected to the transfer-admissible port selected at the aforementioned probability (one of the first through Nth output buffer units $209_1$ through $209_N$).

Although in the first through third embodiments, two kinds of table, including the user identification table 207 and the transfer destination port table 208, are used, but they can as well be combined into a single table, which may be searched for the same purpose.

While the invention has been described with reference to tables as such, but they may as well be structured as lists.

Also, similar searching can be done using an associative memory, such as a contents address memory (CAM).

Although no particular explanation was made with reference to the first through third embodiments, it is also conceivable to require users higher in the order of priority, for instance, to pay a higher charge to the network manager than other users to secure a band and/or to be guaranteed against a delay, and the invention can be applied to privilege such user. It is further possible to apply the invention not only to such arrangements but also to all traffics higher in the order of priority in accordance with some network policy or another.

The present invention can provide the following advantages. First, when two kinds of information are read from what is written in a packet, including information on output ports selectable with priority (transfer destination ports) and output ports to which transferring is possible as judged from the link usage (transfer-admissible ports), if there is no load on any transfer-admissible port, the packet is distributed to that transfer-admissible port. It is thereby made possible to positively utilize unoccupied links and to use network resources more effectively.

Moreover, if a judging unit for the loaded state of transfer-admissible ports determines the presence of a plurality of transfer-admissible ports bearing less loads than a prescribed level with respect to the sending of packets, a packet is distributed to one of these transfer-admissible ports. Therefore, loads can be more dispersed than where they are distributed to one specific transfer-admissible port.

Furthermore, by classifying packet storage buffers into two kinds including low priority buffers and high priority buffers, read-out from which is given priority over the low priority buffers, and distributing packets to low priority buffers as well, it is made possible to reduce impacts on users who are given priority in using ports matching low priority buffers.

While this invention has been described with reference to certain preferred embodiments thereof, it is to be understood that the subject matter encompassed by this invention is not limited to those specific embodiments. Instead, it is intended for the subject matter of the invention to include all such alternatives, modifications and equivalents as can be included within the spirit and scope of the following claims.

What is claimed is:

1. A packet distributing apparatus for distributing each of packets inputted from a plurality of input ports to one of a plurality of output ports, comprising:
   a port information searching unit for searching, on the basis of information written in said packet, for a transfer destination output port to be selected with priority as an output port and for transfer-admissible output ports;
   packet storage buffers for temporarily storing said packet;
   a transfer-admissible port loaded state judging unit for searching for a less loaded one of said transfer-admissible output ports in which the quantity of buffered packet data is less than a prescribed value, on the basis of the usage of the matching one of said packet storage buffers; and
   a packet sending unit for sending, when the load on said transfer destination port is heavy, said packet stored in said packet storage buffer to said less loaded one of said transfer-admissible output ports which has been detected, said packet sending unit comprising a distribution unit for distributing said packet to one of the less loaded ones of said transfer-admissible ports at a probability equal to the reciprocal of the total number of said less loaded transfer-admissible ports if said transfer-admissible port loaded state judging unit finds the presence of a plurality of said less loaded transfer-admissible ports whose quantity of buffered packet data is less than the prescribed value among said transfer-admissible ports.

2. A packet distributing apparatus for distributing each of packets inputted from a plurality of input ports to one of a plurality of output ports, comprising:
   a port information searching unit for searching, on the basis of information written in said packet, for a transfer destination output port to be selected with priority as an output port and for transfer-admissible output ports;
   packet storage buffers for temporarily storing said packet;
   a transfer-admissible port loaded state judging unit for searching for a less loaded one of said transfer-admissible output ports in which the quantity of buffered packet data is less than a prescribed value, on the basis of the usage of the matching one of said packet storage buffers; and
   a packet sending unit for distributing, if said less loaded one of said transfer-admissible output ports is detected, the packet stored in said packet storage buffers to said less loaded one of said transfer-admissible output ports or, if said less loaded one of said transfer-admissible output ports is not detected, the packet stored in said packet storage buffers to said transfer destination port, said packet sending unit comprising a distribution unit for distributing said packet to one of the less loaded ones of said transfer-admissible ports at a probability equal to the reciprocal of the total number of said less loaded transfer-admissible ports if said transfer-admissible port loaded state judging unit finds the presence of a plurality of said less loaded transfer-admissible ports whose quantity of buffered packet data is less than the prescribed value among said transfer-admissible ports.

3. A packet distributing apparatus for distributing each of packets inputted from a plurality of input ports to one of a plurality of output ports, comprising:
   a port information searching unit for searching, on the basis of information written in said packet, for a transfer destination output port to be selected with priority as an output port and for transfer-admissible output ports;
   packet storage buffers for temporarily storing said packet;
   a transfer-admissible port loaded state judging unit for searching for a less loaded one of said transfer-admissible output ports in which the quantity of buffered packet data is less than a prescribed value, on the basis of the usage of the matching one of said packet storage buffers; and
   a packet sending unit for sending, when the load on said transfer destination port is heavy, said packet stored in said packet storage buffer to said less loaded one of said transfer admissible output ports which has been detected, said packet sending unit comprising a usage checking unit for computing a quantity of the packets to be distributed to each of said less loaded transfer-admissible ports on the basis of the ratio in which said less loaded transfer-admissible ports admit loads, and a distribution unit for distributing the packet to one of the less loaded transfer-admissible ports according to the result of computation by the usage checking unit if said transfer-admissible port loaded state judging unit finds the presence of a plurality of said less loaded transfer-admissible ports whose quantity of buffered packet data is less than the prescribed value among said transfer-admissible ports.

4. A packet distributing apparatus for distributing each of packets inputted from a plurality of input ports to one of a plurality of output ports, comprising:

a port information searching unit for searching, on the basis of information written in said packet, for a transfer destination output port to be selected with priority as an output port and for transfer-admissible output ports;

packet storage buffers for temporarily storing said packet;

a transfer-admissible port loaded state judging unit for searching for a less loaded one of said transfer-admissible output ports in which the quantity of buffered packet data is less than a prescribed value, on the basis of the usage of the matching one of said packet storage buffers; and a packet sending unit for distributing, if said less loaded one of said transfer-admissible output ports is detected, the packet stored in said packet storage buffers to said less loaded one of said transfer-admissible output ports or, if said less loaded one of said transfer-admissible output ports is not detected, the packet stored in said packet storage buffers to said transfer destination port, said packet sending unit comprising a usage checking unit for computing a quantity of the packets to be distributed to each of said less loaded transfer-admissible ports on the basis of the ratio in which said less loaded transfer-admissible ports admit loads, and a distribution unit for distributing the packet to one of the less loaded transfer-admissible ports according to the result of computation by the usage checking unit if said transfer-admissible port loaded state judging unit finds the presence of a plurality of said less loaded transfer-admissible ports whose quantity of buffered packet data is less than the prescribed value among said transfer-admissible ports.

* * * * *